(12) United States Patent
Modien

(10) Patent No.: US 6,644,622 B2
(45) Date of Patent: Nov. 11, 2003

(54) EMISSION CONTROL VALVE HAVING A ROBUST SOLENOID ACTUATOR

(75) Inventor: Russell Modien, Chatham (CA)

(73) Assignee: Siemens VDO Automotive Inc., Chatham (CA)

( * ) Notice: Subject to any disclaimer, the term of this patent is extended or adjusted under 35 U.S.C. 154(b) by 73 days.

(21) Appl. No.: 09/994,993

(22) Filed: Nov. 14, 2001

(65) Prior Publication Data

US 2003/0089873 A1 May 15, 2003

(51) Int. Cl.⁷ .............................................. F16K 31/02
(52) U.S. Cl. .............................. 251/129.15; 251/129.01
(58) Field of Search ....................... 251/129.01–129.22

(56) References Cited

U.S. PATENT DOCUMENTS

| 4,494,701 | A | * | 1/1985 | Hensley et al. | ........ | 251/129.21 |
| 5,433,244 | A | * | 7/1995 | Sule | ....................... | 251/129.16 |
| 5,771,884 | A | * | 6/1998 | Yarnall et al. | ......... | 251/129.01 |
| 5,856,771 | A | * | 1/1999 | Nippert | .................. | 251/129.15 |
| 5,901,690 | A | * | 5/1999 | Hussey et al. | ......... | 251/129.18 |
| 5,911,401 | A | * | 6/1999 | Hrytzak et al. | ........ | 251/129.15 |
| 6,299,130 | B1 | * | 10/2001 | Yew et al. | ............. | 251/129.15 |
| 6,453,934 | B1 | * | 9/2002 | Bircann et al. | ........ | 251/129.15 |

* cited by examiner

Primary Examiner—Paul J. Hirsch

(57) ABSTRACT

An automotive emission control valve, an EGR valve in particular, has a solenoid for operating a valve element. The solenoid has a stator and an armature. A shaft is pressed into a through-hole in the armature. Ends of the shaft that protrude from the armature are guided by bearings that are fit to upper and lower pole pieces of the stator.

11 Claims, 2 Drawing Sheets

EMISSION CONTROL VALVE HAVING A ROBUST SOLENOID ACTUATOR

FIELD OF THE INVENTION

The invention relates generally to electric-actuated automotive emission control valves, such as exhaust gas recirculation (EGR) valves, and in particular to improvements that render the actuator more robust.

BACKGROUND OF THE INVENTION

The actuator of certain EGR valves comprises a solenoid that comprises an electromagnet coil and a stator having an air gap at which magnetic flux acts on an armature. The armature motion is transmitted to a valve element to allow flow through a passageway of the valve. Armature motion is resisted by a return spring that acts on the armature, either directly or via the valve member, to bias the armature to a position that causes the valve element to close the passageway.

The stator air gap is defined by an upper pole piece that is disposed at an upper end of the coil and a lower pole piece at the lower end of the coil. The pole pieces have respective annular hubs that fit into an interior space bounded by the coil, approaching each other from opposite ends of the coil. The juxtaposed ends of the two hubs are spaced apart to define the air gap as an annular space about the armature. Electric current in the coil creates magnetic flux that passes from one hub across the air gap to the armature, through the armature, and back across the air gap to the other hub. The flux causes magnetic force to be applied to the armature, and the axial component of that force acts to displace the armature along the centerline of the solenoid.

The displacement of the valve element is guided by a valve guide bearing that is fit to the valve body. The bearing is cylindrical in shape, comprising a central through-hole through which a stem of the valve element passes with a close sliding fit. The temperature and constituent nature of exhaust gases whose recirculation is controlled by the EGR valve expose the valve and its internal mechanism to harsh operating conditions. When an EGR valve is mounted directly on an engine, it is also subject to engine vibration forces, and those forces may also contribute to harshness that the EGR valve experiences.

It is desirable that such a valve guide bearing comprise a material that can withstand conditions like those described for the full expected life of the EGR valve. An example of such a material is carbon-impregnated bronze.

The solenoid actuator is also exposed to conditions like those described, although possibly to a somewhat lesser extent than are the valve element and its guide bearing. In certain EGR valves, displacement of the solenoid armature must be guided independently of that of the valve element. A known armature guide comprises a non-ferromagnetic guide sleeve that extends between the hubs of the upper and lower pole pieces and within which the armature has a close sliding fit. It is desirable to provide lubricity for minimizing friction between the sleeve and armature, for example by coating the armature and/or guide sleeve with a PTFE-based material. Because of a need for increased control accuracy and increased responsiveness of an EGR valve to control signals applied to its actuator, the interface between such a guide sleeve and armature may become a significant factor in the ability of an EGR valve to achieve the desired degrees of accuracy and responsiveness for the useful life of the valve.

Harsh environmental influences like those described may change the character of the guide sleeve and/or armature as the EGR valve ages, and those changes may have undesired effects on the desired control strategy. For example, certain coatings, such as the polymeric PTFE-based coatings mentioned above may experience deterioration when subjected to extreme heat and vibration, and that deterioration may effect how an EGR valve responds to control signals, thereby affecting a desired control strategy.

Accordingly, improvements in armature guidance that would enable an EGR valve to maintain desired control accuracy and responsiveness over the useful life of the valve are seen to be useful, especially as increasingly strict emission regulations become effective.

SUMMARY OF THE INVENTION

It is an object of this invention to provide such improvements in armature guidance in an EGR valve.

One general aspect of the invention relates to an emission control valve for controlling flow of gases with respect to combustion chamber space of an internal combustion engine. The valve comprises a valve body comprising a passageway having an inlet port for receiving gases, an outlet port for delivering gases to the combustion chamber space, a valve element that is selectively positioned to selectively restrict the passage, and a mechanism for selectively positioning the valve element. The mechanism comprises a solenoid having an electromagnet coil, a stator that is associated with the coil and that has a magnetic circuit for conducting magnetic flux generated in the stator when electric current flows in the coil, including an air gap disposed within interior space bounded by the coil, and an armature that is disposed at the air gap and displaced along an imaginary centerline by the magnetic flux to position the valve element. A shaft is pressed into a central axial through-hole in the armature to create a shaft-armature assembly wherein opposite end portions of the shaft protrude from opposite ends of the through-hole. Bearings guide displacement of the shaft-armature assembly along the centerline. An annular lower bearing is fit to a lower pole piece of the stator and an annular upper bearing is fit to an upper pole piece of the stator. The shaft-armature assembly, the upper pole piece, the lower pole piece, and the electromagnet coil are arranged in an assembled relationship to dispose the armature within the interior space bounded by the coil with the end portions of the shaft passing through respective central through-holes in the bearings concentric with the imaginary centerline and with the pole pieces disposed at opposite ends of the coil to create the air gap within the coil interior space and to associate the pole pieces with additional stator structure that conducts magnetic flux between the pole pieces external to the coil interior space.

Another aspect relates to a method of making an emission control valve, as just described, comprising: pressing the shaft into the central axial through-hole in the armature to create a shaft-armature assembly wherein opposite end portions of the shaft protrude from opposite ends of the through-hole; fitting the annular lower bearing to the lower pole piece to create a lower bearing-pole piece assembly; fitting the annular upper bearing to the upper pole piece to create an upper bearing-pole piece assembly; and assembling the shaft-armature assembly, the upper bearing-pole piece assembly, the lower bearing-pole piece assembly, and the electromagnet coil to dispose the armature within the interior space bounded by the coil with the end portions of the shaft passing through the bearing through-holes concentric with the imaginary centerline and with the bearing-pole piece assemblies disposed at opposite ends of the coil to create the air gap within the coil interior space and to associate the pole pieces with additional stator structure that conducts magnetic flux between the pole pieces external to the coil interior space.

The accompanying drawings, which are incorporated herein and constitute part of this specification, include one or more presently preferred embodiments of the invention, and together with a general description given above and a detailed description given below, serve to disclose principles of the invention in accordance with a best mode contemplated for carrying out the invention.

DESCRIPTION OF THE PREFERRED EMBODIMENT

Figures 1, 3:
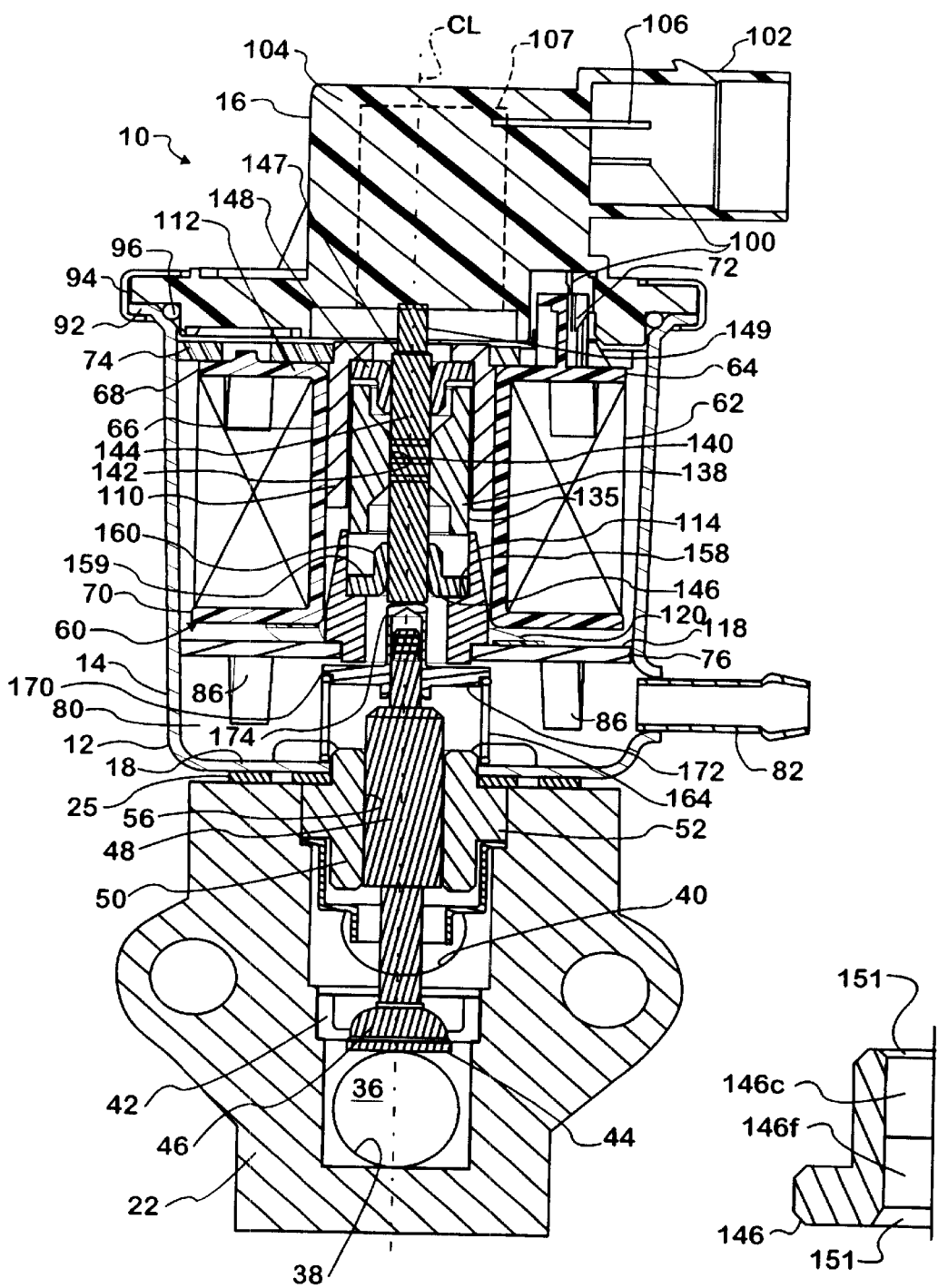
FIG. 1 is a cross section view, in elevation, of an exemplary embodiment of the present invention comprising an emission control valve including a solenoid actuator.
FIG. 3 is an enlarged view of a portion of one element of FIG. 2 by itself.

FIG. 1 shows an exemplary EEGR valve 10 that comprises a housing assembly 12 provided by a shell 14 having an open upper end that is closed by a cap 16. Shell 14 further comprises a flat bottom wall 18 that is disposed atop a flat upper surface of a base 22 with a spacer 25 between them. Fasteners (not shown) secure the shell to the base. Base 22 is adapted to mount on a component of an internal combustion engine, such as a manifold not specifically shown in the drawing.

Valve 10 comprises a flow passage 36 extending through base 22 between an inlet port 38 and an outlet port 40. With valve 10 mounted on the engine, inlet port 38 is placed in communication with engine exhaust gas expelled from the engine cylinders and outlet port 40 is placed in communication with the intake flow into the cylinders.

A valve seat element 42 is disposed in passage 36 proximate inlet port 38 with the outer perimeter of the seat element sealed to the passage wall. Valve seat 42 has an annular shape comprising a through-hole. A one-piece valve member 44 comprises a valve head 46 and a valve stem 48 extending co-axially from head 46 along an imaginary centerline CL of the valve. Head 46 is shaped for cooperation with seat element 42 to close the through-hole in the seat element when valve 10 is in closed position shown in FIG. 1.

Valve 10 further comprises a bearing member 50 that is basically a circular cylindrical member except for a circular flange 52 near its upper end that seats it in a counterbore in base 22.

Bearing member 50 further comprises a central circular through-hole, or through-bore, 56 with which stem 48 has a close sliding fit. Bearing member 50 may comprise a material that possesses some degree of lubricity providing for low-friction guidance of valve member 44 along centerline CL.

Valve 10 further comprises an electromagnetic actuator 60, namely a solenoid, disposed within shell 14 coaxial with centerline CL. Actuator 60 comprises an electromagnetic coil 62 and a polymeric bobbin 64. Bobbin 64 comprises a central tubular core 66 and flanges 68, 70 at opposite ends of core 66. Coil 62 comprises a length of magnet wire wound around core 66 between flanges 68, 70. Respective terminations of the magnet wire are joined to respective electric terminals mounted side-by-side on flange 68, only one terminal 72 appearing in the view of FIG. 1.

Actuator 60 comprises stator structure associated with coil 62 to form a portion of a magnetic circuit path. The stator structure comprises an upper pole piece 74, disposed at one end of the actuator coaxial with centerline CL, and a lower pole piece 76 disposed at the opposite end of the actuator coaxial with centerline CL. Shell 14 comprises a side wall 78, a portion of which extends between pole pieces 74, 76 to complete the stator structure exterior of the coil and bobbin.

An air circulation space 80 is provided within shell 14 axially below actuator 60. This air space is open through a nipple 82 at the side wall. The shell side wall has lanced tabs 86 defining a lower ledge on which the outer margin of lower pole piece 76 rests and an upper ledge (not visible in the Fig.) on which the outer margin of upper pole piece 74 rests. Cap 16 comprises an outer margin that is held secure against a rim 92 at the otherwise open end of the shell side wall by a clinch ring 94. A circular seal 96 is disposed between the cap and shell to make a sealed joint between them.

The radial dimension of shell 14 holds upper pole piece 74 in its axially placed position against the tabs 86 forming the upper ledge. Cap 16 comprises a first pair of electric terminals, only one terminal 100 appearing in FIG. 1, that mate respectively with the terminals on bobbin flange 68. The cap terminals protrude externally from the cap material where they are bounded by a surround 102 of the cap material to form a connector adapted for mating connection with a wiring harness connector (not shown) for connecting the actuator to an electric control circuit.

Cap 16 also comprises a tower 104 providing an internal space for a position sensor 107 (shown mainly in phantom) that comprises plural electric terminals, only one terminal 106 appearing in the Figure, that protrude into the surround for connecting the sensor with a circuit via the mating wiring harness connector.

The construction of valve 10 is such that leakage between passage 36 and air circulation space 80 is prevented. Bearing member through-hole 56 is open to passage 36, but valve stem 48 has a sufficiently close sliding fit therein to substantially occlude the through-hole and prevent leakage between passage 36 and air circulation space 80 while providing low-friction guidance of the stem along centerline CL.

Upper pole piece 74 is a ferromagnetic part that comprises a cylindrical-walled, axially-extending annular hub 110 that enters the coil interior space concentric with centerline CL from the upper end of the coil. Pole piece 74 further comprises an annular radial flange 112 that girdles hub 110 external to the coil interior space in covering relation to a respective end of the coil bobbin. Flange 112 is disposed against bobbin flange 68, thereby axially and radially relating bobbin 64 and upper pole piece 74. Flange 112 has a clearance slot for bobbin terminals 72.

Lower pole piece 76 is a ferromagnetic part comprising a circular flange 118 that girdles a central hub 114. Hub 114 enters the coil interior space from the lower end of the bobbin but stops short of hub 110. An annular wave spring 120 is disposed between flange 118 and bobbin flange 70 for maintaining bobbin flange 68 against flange 112 to compensate for differential thermal expansion.

Hub 114 comprises a radially outer surface that has a frustoconical taper about centerline CL and a radially inner surface that is parallel with centerline CL. Actuator 60 further comprises a ferromagnetic armature 135 arranged for displacement along centerline CL and cooperating with the stator structure in forming the magnetic circuit of actuator 60.

Armature 135 comprises a circular cylindrical outer wall 138 of suitable radial thickness for the magnetic flux that it conducts. Midway between its opposite ends armature 135 has a transverse wall 140 that contains a through-hole 142 concentric with centerline CL. A shaft 144 that has been pressed into through-hole 142 creates a shaft-armature assembly 147 wherein opposite end portions of shaft 144 protrude from opposite ends of through-hole 142, and also beyond opposite ends of the armature side wall. The press-fit may be aided by knurling on the shaft to reduce the precision of diameter control that is required. The opposite faces of transverse wall 140 are frustoconical about centerline CL.

Bearings 146, 148 guide displacement of shaft-armature assembly 147 along centerline CL. Bearing 146 is an annular lower bearing that is fit to hub 144 of lower pole piece 76. Bearing 148 is an annular upper bearing that is fit to hub 110 of upper pole piece 74.

Shaft-armature assembly 147, upper pole piece 74, lower pole piece 76, and electromagnet coil 62 are arranged in an assembled relationship to dispose armature 135 within the interior space bounded by coil 62 with the end portions of shaft 144 passing through respective central through-holes in the bearings concentric with the imaginary centerline and with the pole pieces disposed at opposite ends of the coil to create the air gap within the coil interior space and to associate the pole pieces with shell side wall 78 that conducts magnetic flux between the pole pieces external to the coil interior space.

Hub 114 comprises a radially inner surface having a shoulder 158. Bearing 146 is fit to hub 114 by an interference fit of an outer cylindrical surface of the bearing to an inner surface of the hub while the bearing is seated on shoulder 158. Bearing 146 further comprises a shoulder 159 extending radially inward from that outer cylindrical surface, and a boss 160 extending axially from shoulder 159.

FIG. 1 shows the closed position of valve 10 wherein a preloaded helical coil spring 164 is resiliently biasing valve head 46 to seat on seat element 42, closing passage 36 to flow between ports 38 and 40. A spring seat element 170 is crimped onto the free end of valve stem 48 and comprises both a seat 172 for one end of spring 164 and a post 174 against the free end of which shaft 144 is resiliently biased to a specific location by a spring in the position sensor in tower 104 to maintain the lower end of the shaft in contact with the post when valve head 46 is seated on seat element 42. The position sensor has a shaft 149 that is resiliently biased against the upper end of shaft 144. The opposite end of spring 164 seats on wall 18.

As electric current begins to increasingly flow through coil 62, the magnetic circuit exerts increasing force urging armature 135, and hence shaft-armature assembly 147, in the downward direction as viewed in FIG. 1. Once the force is large enough to overcome the bias of the pre-load force of spring 154, armature 135 begins to move downward, similarly moving valve element 44 and opening valve 10 to allow flow through passage 36 between the two ports. The extent to which the valve is allowed to open is controlled by the electric current in coil 62. Because shaft 144 is captured between the spring-biased shaft 149 and post 174 as the armature is displaced, shaft 149 tracks the extent of armature displacement to enable position sensor 107 to provide a feedback signal representing valve position, and hence the extent of valve opening. The actual control strategy for the valve is determined as part of the overall engine control strategy embodied by an associated electronic engine control.

The nature of the interface between post 174 and shaft 144 compensates for any slight non-concentricity between bearing member 50 and shaft 144 such that force transmitted from the shaft to armature, and vice versa, is essentially exclusively along centerline CL rather than having a radial component that might undesirably affect the transmission of motion from one to the other. Shaft 144 also provides a means for transmitting armature motion to the position sensor housed within tower 104.

Figure 2:
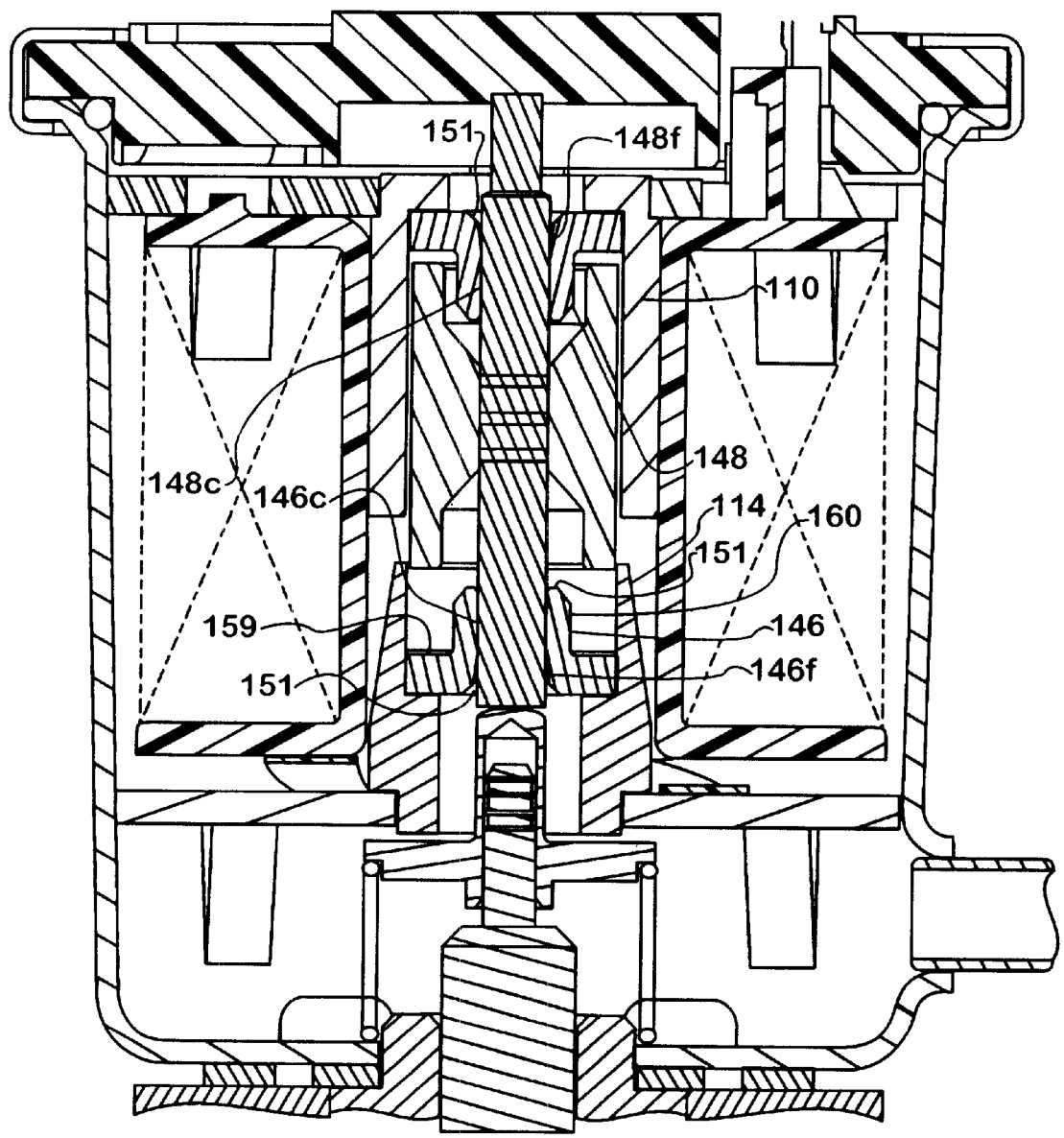
FIG. 2 is an enlarged fragmentary view of a portion of FIG. 1 showing greater detail

Each bearing 146, 148 is disposed to present an interference with armature 135 for limiting displacement of the armature in opposite directions along the centerline. Each bearing through-hole is constructed to compensate for any slight non-concentricity between the bearings and shaft 144. FIGS. 2 and 3 better illustrate that construction. The portion 146*c*, 148*c*, of the wall of each through-hole that is toward armature 135 has a circular cylindrical shape. Beyond each portion 146*c*, 148*c*, the portion 146*f*, 148*f* of the respective through-hole wall has a frustoconical shape that provides clearance to shaft 144. The edges of each through-hole at opposite ends of the respective bearing are chamfered, reference numeral 151, to provide leads at the entrances of the through-holes. Portions 146*f*, 148*f* extend for approximately one-half the length of the respective through-hole, and allow the bearings to compensate for any slight non-concentricity of the bearings to centerline CL when the bearings are fit to the upper and lower pole pieces.

Because the armature is not guided by a surrounding non-ferromagnetic sleeve, it becomes possible to reduce the radial distance separating the outer surface of armature wall 138 from the inner surfaces of hubs 110, 114 within which the armature is displaced. Such reduction in radial distance is effective to increase the efficiency of the magnetic circuit by increasing the electromagnetic force that can be developed for a given amount of coil current.

The construction also allows the position of armature wall 138 to be set in relation to the free end of hub 114. Post 174 of spring seat element 170 is set to a desired position on the end of stem 48 and crimped in place. Shaft 144 is pressed into through-hole 142 to place the armature in a position on the shaft such that when the lower end of the shaft is abutting the free end of post 174, armature 135 is located at a desired position along centerline CL relative to the upper and lower pole pieces. For calibrating the valve, it is desirable to locate the lower end of armature wall 138 in relation to the free end of the tapered hub 114.

The material of bearings 146, 148 is like that of bearing 50, and may comprises for example, a composite sintered material having a lubrous coating such as a PTFE-based one.

While the foregoing has described a preferred embodiment of the present invention, it is to be appreciated that the inventive principles may be practiced in any form that falls within the scope of the following claims.

What is claimed is:

1. An emission control valve for controlling flow of gases with respect to combustion chamber space of an internal combustion engine comprising:
   a valve body comprising a passageway having an inlet port for receiving gases and an outlet port for delivering gases to the combustion chamber space;
   a valve element that is selectively positioned to selectively restrict the passage; and a mechanism for selectively positioning the valve element comprising a solenoid having an electromagnet coil bounding an interior space, a stator that is associated with the coil and that has a magnetic circuit for conducting magnetic flux generated in the stator when electric current flows in the coil, including an air gap disposed within the interior space bounded by the coil, and an armature that is disposed at the air gap and displaced along an imaginary centerline by the magnetic flux to position the valve element;

a shaft that is pressed into a central axial through-hole in the armature to create a shaft-armature assembly wherein opposite end portions of the shaft protrude from opposite ends of the through-hole;

and bearings for guiding displacement of the shaft-armature assembly along the centerline comprising an annular lower bearing that is fit to a lower pole piece of the stator and an annular upper bearing that is fit to an upper pole piece of the stator;

wherein the shaft-armature assembly, the upper pole piece, the lower pole piece, and the electromagnet coil are arranged in an assembled relationship to dispose the armature within the interior space bounded by the coil with the end portions of the shaft passing through respective central through-holes in the bearings concentric with the imaginary centerline and with the pole pieces disposed at opposite ends of the coil to create the air gap within the coil interior space and to associate the pole pieces with additional stator structure that conducts magnetic flux between the pole pieces external to the coil interior space.

2. An emission control valve as set forth in claim 1 wherein each pole piece comprises a central annular hub that enters the coil interior space from a respective end of the coil and an annular flange that girdles the hub external to the coil interior space in covering relation to a respective end of the coil.

3. An emission control valve as set forth in claim 2 wherein one of the hubs comprises a radially inner surface having a shoulder, and the bearing that is fit to the pole piece comprising the one hub is seated on that shoulder.

4. An emission control valve as set forth in claim 3 wherein the bearing that is seated on that shoulder of the one hub comprises a cylindrical outer surface that is interference fit to an inner surface of the one hub, a shoulder extending radially inward from that cylindrical outer surface, and a boss extending axially from that shoulder.

5. An emission control valve as set forth in claim 4 wherein the shoulder is disposed to present an interference with the armature for limiting displacement of the armature in a direction toward the bearing comprising the one hub.

6. An emission control valve as set forth in claim 5 wherein the one hub comprises a radially outer surface that has a frustoconical taper.

7. An emission control valve as set forth in claim 1 wherein each bearing is disposed to present an interference with the armature for limiting displacement of the armature in a respective direction along the centerline.

8. An emission control valve as set forth in claim 1 wherein the central through-hole in each bearing comprises a taper that extends for approximately one-half the through-hole length, the taper being in that portion of the respective through-hole that is further away from the armature that a portion of the respective through-hole that guides the shaft-armature assembly.

9. An emission control valve as set forth in claim 1 wherein the valve element comprises a valve head that is resiliently biased against a valve seat in closure of the passageway, a stem extending from the valve head toward the shaft, a spring seat element that is fit to the stem and comprises both a seat for one end of a spring that imparts resilient bias to the valve element to thereby resiliently bias the valve head against the valve seat and a post against which the shaft is resiliently biased by a spring to maintain the shaft in contact with the post when the valve head is seated on the valve seat.

10. A method of making an emission control valve that has a valve body comprising a passageway having an inlet port for receiving gases and an outlet port for delivering gases to the combustion chamber space, a valve element that is selectively positioned to selectively restrict the passage, and a mechanism for selectively positioning the valve element comprising a solenoid having an electromagnet coil bounding an interior space, a stator that is associated with the coil and that has a magnetic circuit comprising an air gap for conducting magnetic flux generated in the stator when electric current flows in the coil, and an armature that is disposed in the air gap to be displaced along an imaginary centerline by the magnetic flux for positioning the valve element, the method comprising:

pressing a shaft into a central axial through-hole in the armature to create a shaft-armature assembly wherein opposite end portions of the shaft protrude from opposite ends of the through-hole;

fitting an annular lower bearing having a central through-hole to a lower pole piece of the stator to create a lower bearing-pole piece assembly;

fitting an annular upper bearing having a central through-hole to an upper pole piece of the stator to create an upper bearing-pole piece assembly;

assembling the shaft-armature assembly, the upper bearing-pole piece assembly, the lower bearing-pole piece assembly, and the electromagnet coil to dispose the armature within the interior space bounded by the coil with the end portions of the shaft passing through the bearing through-holes concentric with the imaginary centerline and with the bearing-pole piece assemblies disposed at opposite ends of the coil to create the air gap within the coil interior space and to associate the pole pieces with additional stator structure that conducts magnetic flux between the pole pieces external to the coil interior space.

11. A method as set forth in claim 10 including joining a spring locator to the valve element to place the spring locator at a predetermined position along the centerline when the valve is biased closed by an associated valve bias spring that seats on the spring locator, and capturing the shaft-armature assembly between the spring locator and a position sensor shaft that a position sensor resiliently biases against the spring locator in a direction opposite that of the associated valve bias spring.

* * * * *